United States Patent [19]

Katsumoto et al.

[11] Patent Number: 5,776,361
[45] Date of Patent: Jul. 7, 1998

[54] MULTI-COMPONENT OXYGEN SCAVENGING COMPOSITION

[75] Inventors: Kiyoshi Katsumoto, El Cerrito; Ta Yen Ching, Novato, both of Calif.

[73] Assignee: Chevron Chemical Company, San Ramon, Calif.

[21] Appl. No.: 698,011

[22] Filed: Aug. 13, 1996

Related U.S. Application Data

[63] Continuation-in-part of Ser. No. 388,815, Feb. 15, 1995, Pat. No. 5,660,761.

[51] Int. Cl.[6] .............................. C09K 15/02; B32B 1/00; B32B 27/18
[52] U.S. Cl. .................. 252/188.28; 252/380; 252/383; 428/35.3; 428/35.4; 428/35.8; 428/35.9
[58] Field of Search ........................... 252/188.28, 380, 252/383; 428/35.3, 35.4, 35.8, 35.9

[56] References Cited

U.S. PATENT DOCUMENTS

| 5,211,875 | 5/1993 | Speer et al. | 252/188.28 |
| 5,310,497 | 5/1994 | Speer et al. | 252/188.28 |
| 5,346,644 | 9/1994 | Speer et al. | 252/188.28 |
| 5,627,239 | 5/1997 | Ching et al. | 525/330.6 |
| 5,660,761 | 8/1997 | Katsumoto et al. | 252/188.28 |

*Primary Examiner*—Shean C. Wu
*Attorney, Agent, or Firm*—W. Bradley Haymond; Marianne H. Michel

[57] ABSTRACT

An oxygen scavenging composition or system is provided comprising at least one polyterpene and at least one catalyst effective in catalyzing an oxygen scavenging reaction. A film, a multi-phase composition, a multi-layer composition, an article comprising the oxygen scavenging composition, a method for preparing the oxygen scavenging composition, and a method for scavenging oxygen are also provided.

38 Claims, 6 Drawing Sheets

MULTI-COMPONENT OXYGEN SCAVENGING COMPOSITION

This application is a continuation-in-part of application Ser. No. 08/388,815 filed Feb. 15, 1995, now U.S. Pat. No. 5,660,761.

BACKGROUND OF THE INVENTION

The present invention relates to an oxygen scavenging composition or system which can be employed in films, multi-layer films, sheets and molded or thermoformed shapes that find utility in low oxygen packaging for pharmaceuticals, cosmetics, oxygen sensitive chemicals, electronic devices, and food.

Organic oxygen scavenging materials have been developed partly in response to the food industry's goal of having longer shelf-life for packaged food.

One method which is currently being employed involves the use of "active packaging" where the package is modified in some way so as to control the exposure of the product to oxygen. Such "active packaging" can include sachets containing iron based compositions such as AGELESS™ which scavenges oxygen within the package through an oxidation reaction. However, such an arrangement is not advantageous for a variety of reasons including the accidental ingestion of the sachets or the oxygen-scavenging material present therein.

Other techniques involve incorporating an oxygen scavenger into the package structure itself. In such an arrangement, oxygen scavenging materials constitute at least a portion of the package, and these materials remove oxygen from the enclosed package volume which surrounds the product or which may leak into the package, thereby in the case of food products, inhibiting spoilage and prolonging freshness.

Oxygen scavenging materials include low molecular-weight oligomers that are typically incorporated into polymers or can be oxidizable organic polymers. Such oxygen scavenging materials are typically employed with a suitable catalyst, e.g., an organic or inorganic salt of a transition metal catalyst such as cobalt neodeconate, cobalt stearate, etc.

Often, these oxygen scavenging compositions are not effective at low temperatures. The compositions require a long induction period or do not scavenge oxygen under the storage environments for certain packaged food applications.

Another major problem is that a wide variety of organic compounds are produced upon oxidation of certain oxygen scavenging materials. Many of these oxidation products can migrate from the oxygen scavenging material and enter the headspace surrounding the food or even enter the food itself. Some oxidation products, such as low molecular weight aldehydes and carboxylic acids, have foul odors or unpleasant taste or can be compounds that are otherwise undesirable.

SUMMARY OF THE INVENTION

It is an object of the present invention to provide a composition effective for oxygen scavenging.

It is another object of the present invention to provide a composition effective for oxygen scavenging at low temperatures.

It is another object of the present invention to provide a composition which produces reduced levels of oxidation by-products.

It is another object of the present invention to provide an article, package or container suitable for oxygen scavenging.

It is another object of the present invention to provide a method for preparing an oxygen scavenging composition.

It is another object of the present invention to provide a method for scavenging oxygen.

According to the present invention, an oxygen scavenging composition or system is provided comprising at least one polyterpene and at least one catalyst effective in catalyzing the oxygen scavenging reaction. A film, a multi-phase composition, a multi-layer composition, an article comprising the oxygen scavenging composition, a method for preparing the oxygen scavenging composition, and a method for scavenging oxygen are also provided.

DETAILED DESCRIPTION OF THE INVENTION

It has been found that polyterpenes are especially effective oxygen scavenging materials particularly at low temperatures, e.g., refrigerated food temperatures. Examples of such compounds include poly(alpha-pinene), poly (dipentene), poly(beta-pinene), poly(d-limonene), and poly (d,l-limonene).

The polyterpenes can be introduced into the oxygen scavenging system by a variety of techniques. The polyterpenes can be formed into films, coated onto a material such as aluminum foil or paper, formed into bottles or other rigid containers, or even incorporated into a material such as paper, for example, in flexible and rigid packaging. The polyterpene can also be in a localized area on a layer, for example, it may be in a patch that is laminated to another layer.

The polyterpene is generally present in an amount sufficient to scavenge at least 0.1 cc $O_2$/gram of oxygen scavenging composition/day. Preferably, it is capable of scavenging at least about 0.5, and more preferably at least about 1 cc $O_2$/gram of oxygen scavenging composition/day.

The amount of polyterpene employed in the oxygen scavenging composition can vary broadly depending on the desired characteristics of the final product. Generally, the polyterpene is present in an amount in the range of from about 5 weight percent to about 95 weight percent based on the total oxygen scavenging composition, preferably from about 10 weight percent to about 75 weight percent, and more preferably from 15 weight percent to 50 weight percent.

The polyterpene can be blended with a carrier resin comprising other oxidizable polymers or polymers having a slower oxidation rate than the polyterpene.

Examples of other oxidizable polymers include substituted or unsubstituted ethylenically unsaturated hydrocarbons such as polybutadiene, polyisoprene, and styrene-butadiene block copolymers. Other examples include those described in U.S. Pat. Nos. 5,211,875 and 5,346,644 to Speer et al., which are hereby incorporated by reference in their entirety. Other examples include poly(meta-xylenediamine-adipic acid) (also known as MXD6), acrylates which can be prepared by transesterification of poly(ethylene-methyl acrylate) such as poly(ethylene-methyl acrylate-benzyl acrylate), poly(ethylene-methyl acrylatetetrahydrofurfuryl acrylate), poly(ethylene-methyl acrylate-nopolacrylate) and mixtures thereof. Such transesterification processes are disclosed in 08/475,918 filed Jun. 7, 1995, now U.S. Pat. No. 5,627,239 the disaclosure of which is hereby incorporated by reference. In a preferred embodiment, the carrier resin oxidizes at a slower rate than the polyterpene. Oxygen scavenging compositions prepared from such carrier resins produce reduced amounts of migratory oxidation by-products such as low molecular weight aldehydes, alkenes and carboxylic acids.

Typical examples of carrier resins exhibiting a slower oxidation rate include polyesters, polyaromatics, or polyolefin homopolymers, copolymers, or terpolymers. Specific examples of polymers exhibiting a slower oxidation rate include polyethylene, low density polyethylene, high density polyethylene, linear low density polyethylene, polystyrene, as well as copolymers such as poly(ethylene-vinyl acetate), poly(ethylene-methyl acrylate), poly(ethylene-ethyl acrylate), poly(ethylene-butyl acrylate), and ionomers of poly(ethylene-methyl acrylate), poly(ethylene-ethyl acrylate), or poly(ethylene-acrylic acid).

Polyethylene including low density, linear low density, or ultra-low density polyethylene is preferred due to its processability and versatility.

The amount of carrier resin employed can vary broadly. Generally, the carrier resin is present in an amount in the range of from about 5 weight percent to about 95 weight percent based on the total weight of the oxygen scavenging composition, preferably from about 25 weight percent to about 90 weight percent, and more preferably from 50 weight percent to 85 weight percent.

The catalyst can be any catalyst known in the art which is effective in initiating the oxygen scavenging reaction. Typical catalysts include transition metal salts. Suitable catalysts are disclosed in U.S. Pat. Nos. 5,211,875 and 5,346,644 to Spear et al., the disclosures of which are hereby incorporated by reference in their entirety. Cobalt compounds are preferred and cobalt oleate, cobalt linoleate, cobalt neodecanoate, cobalt stearate and cobalt caprylate are especially preferred.

The catalyst is present in an amount sufficient to catalyze the oxygen scavenging reaction. Generally, the catalyst will be present in an amount in the range of from about 50 ppm to about 10,000 ppm based on the total weight of the oxygen scavenging composition, preferably from 100 ppm to 10,000 ppm, and more preferably from 100 ppm to 5,000 ppm.

The catalyst can be introduced in any manner which does not react with and/or deactivate the catalyst. For example, the catalyst can be applied onto the oxygen scavenging material by any suitable means, e.g., coating techniques such as spray coating, extrusion compounding (including masterbatching) or lamination.

The oxygen scavenging composition can be activated by methods known in the art such as ultraviolet, e-beam, or thermal triggering. Preferably, the composition is activated with 0.2–5 $J/cm^2$ of UV radiation in the range of from 250–400 nm. A photoinitiator is useful for decreasing the catalyst activation time. Effective photoinitiators include those known in the art.

In another aspect of the invention, the oxygen scavenging composition comprises a first phase comprising the polyterpene and a second phase comprising the catalyst. The first phase is essentially devoid of catalyst. The second phase is in sufficiently close proximity to the first phase to catalyze the oxygen scavenging reaction. When the polyterpene and the catalyst are in separate phases, processing difficulties, such as deactivation of the catalyst, are avoided.

In another aspect of the invention, the catalyst is incorporated into a polymeric material to form at least one catalyst-containing layer. In such a case, the catalyst-containing layer can be situated between the package contents and an oxygen scavenging layer or between the outside of the package and the oxygen scavenging layer. Also, the catalyst layer can be located between two oxygen scavenging layers or the oxygen scavenging layer can be located between two catalyst layers.

In another aspect of the invention, the oxygen scavenging composition or system can include a polymeric selective barrier layer. The selective barrier layer functions as a selective barrier to certain oxidation by-products, but not to oxygen itself. Preferably, the layer prevents at least half of the number and/or amount of oxidation by-products having a boiling point of at least 40° C. from passing through the polymeric selective barrier layer.

The oxygen scavenging composition can include additives, stabilizers, plasticizers and UV sensitizers (i.e., photoinitiators) which do not interfere with the oxygen scavenging function.

The oxygen scavenging compositions or systems can be employed in the production of packages, both rigid and flexible, by techniques which are known in the art.

The oxygen scavenging compositions of the present invention are especially effective in low temperature environments. The compositions of the present invention also produce reduced amounts of migratory oxidation by-products. Of particular interest is the reduction of oxidation by-products such as low molecular weight aldehydes, alkenes and carboxylic acids which can adversely affect organoleptics.

The present invention is also useful in improving the shelf-life of packaged oxygen-sensitive products such as pharmaceuticals, cosmetic, chemical, electronic devices, health and beauty products. The system can also be used in moldings, coatings, patches, bottle cap inserts and molded or thermoformed shapes, such as bottles and trays. In all of these applications, the oxygen scavenging composition effectively scavenges oxygen, whether it comes from the headspace of the packaging, is entrained in the food or product, or originates from outside the package.

The present invention will now be described further in terms of certain examples which are solely illustrative in nature and should in no way limit the scope of the present invention.

EXAMPLES

Blends of various resins were prepared as follows.

Figure 1:
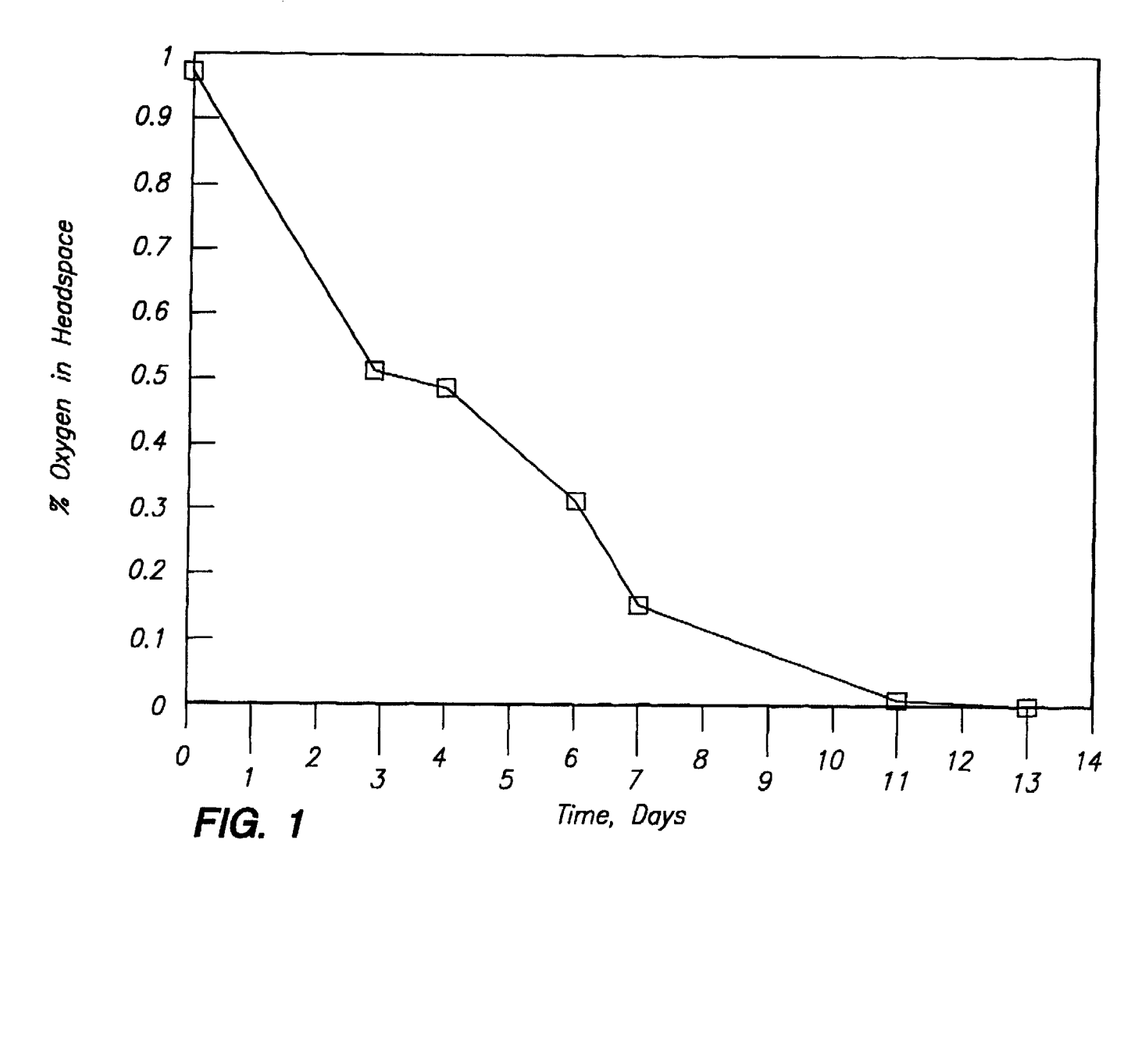
FIG. 1 graphically shows the oxygen scavenging performance of an oxygen scavenging composition comprising 30% polyterpene and 70% polyethylene.
Figure 2:
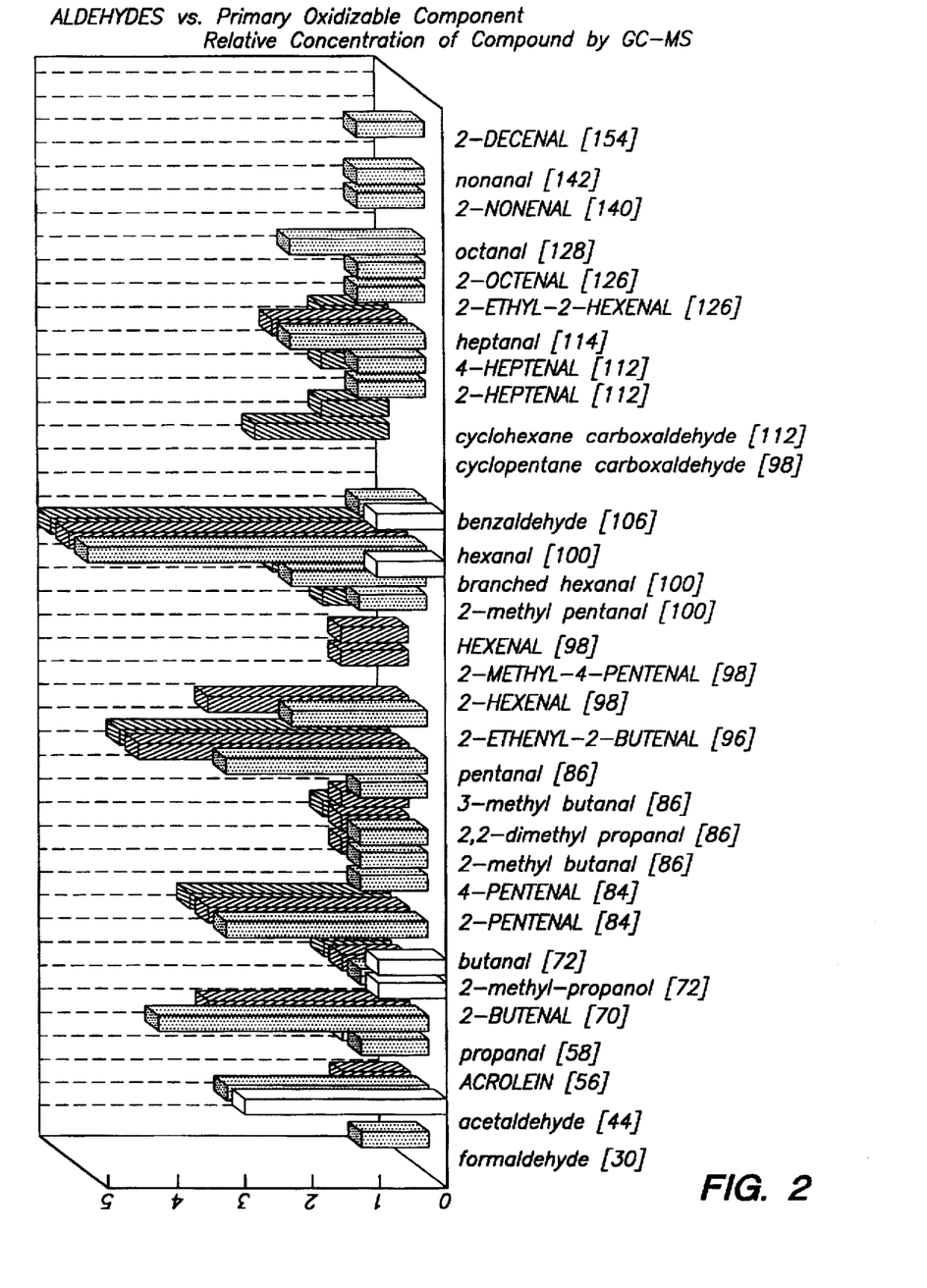
FIGS. 2-4 show by bar graphs the relative amounts of specific aldehydes produced from examples containing blends of polyethylene with polyterpene, styrene/butadiene block copolymer, polybutadiene, or polyoctenamer.
Figure 3:
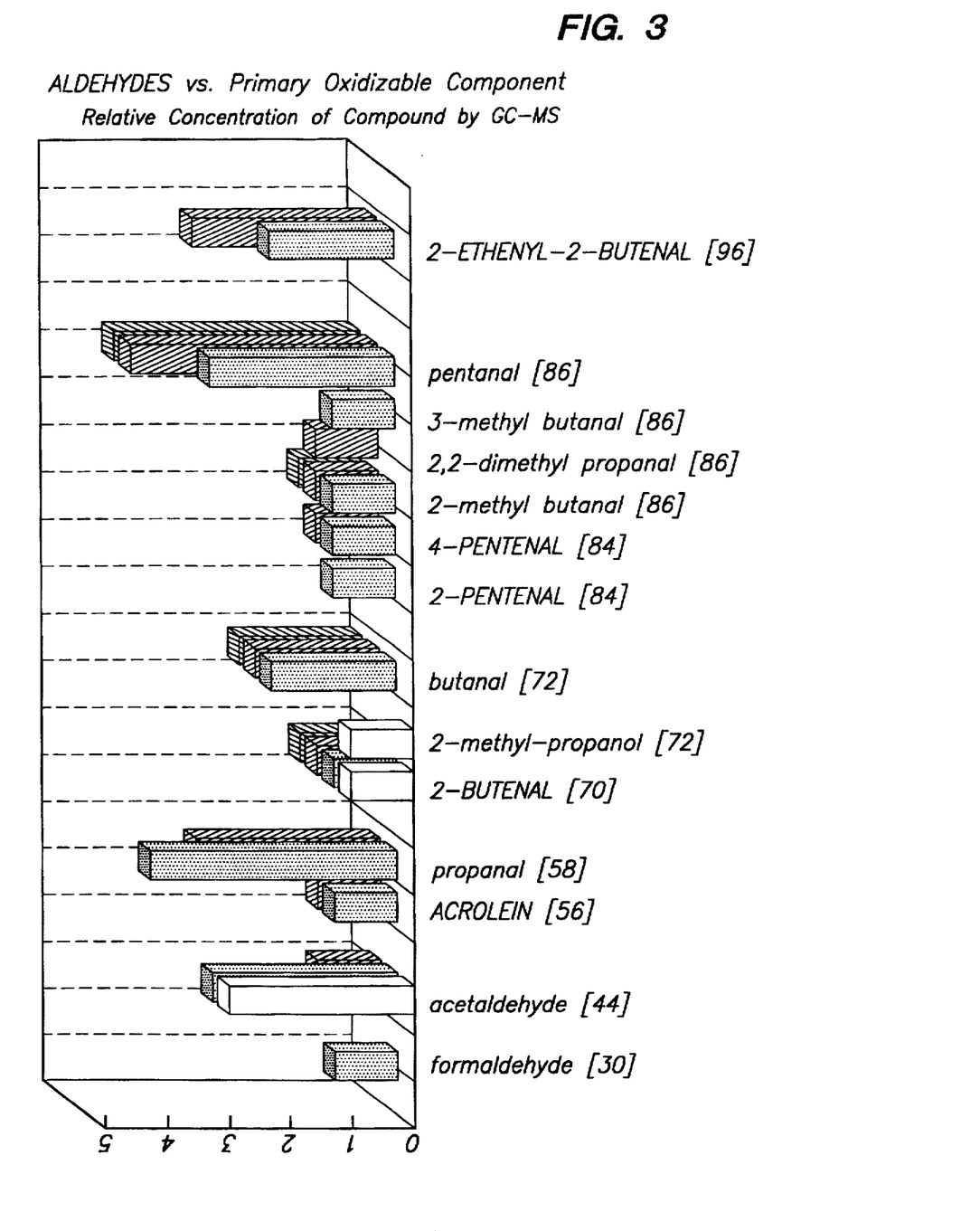
Figure 4:
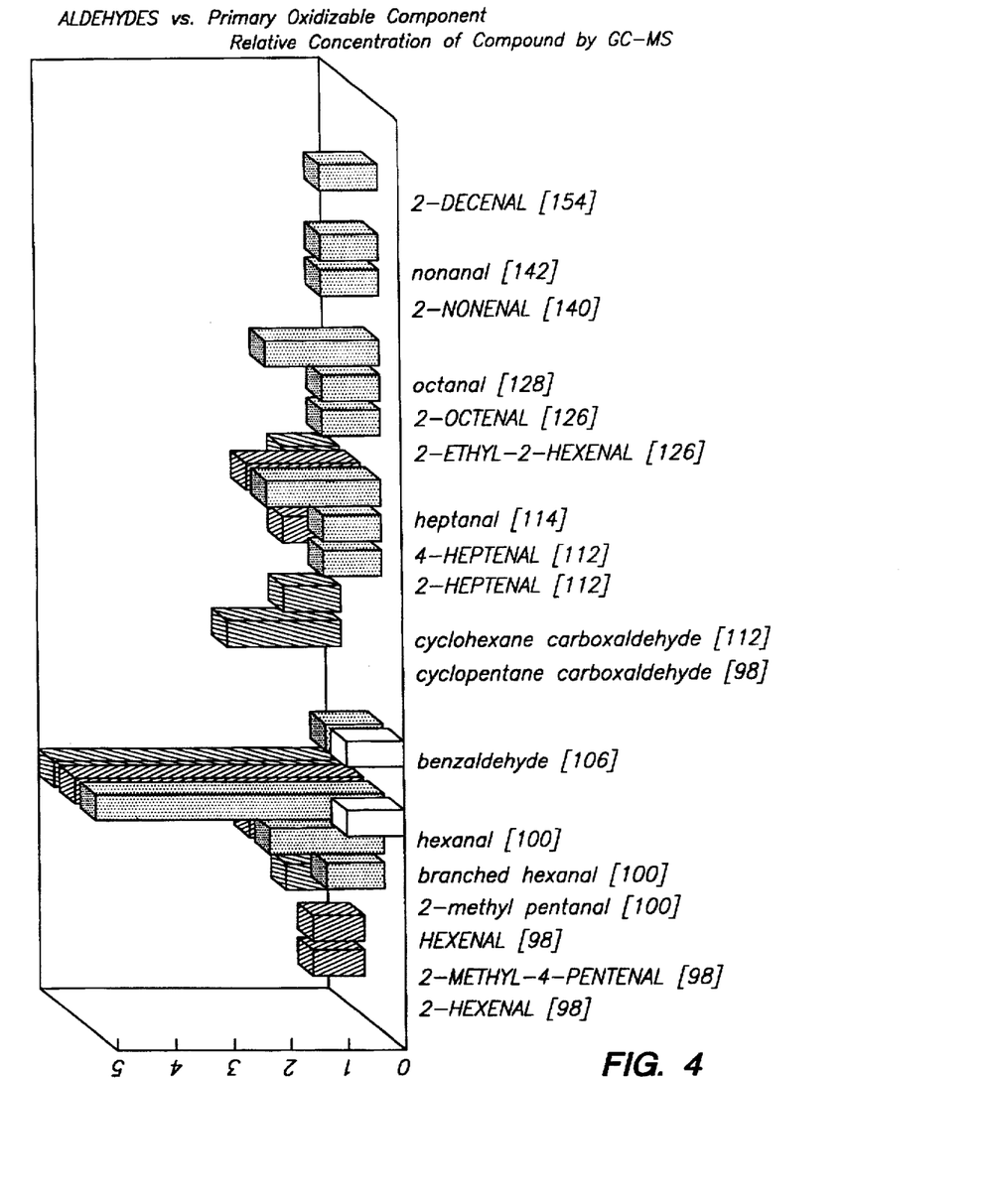
Figure 5:
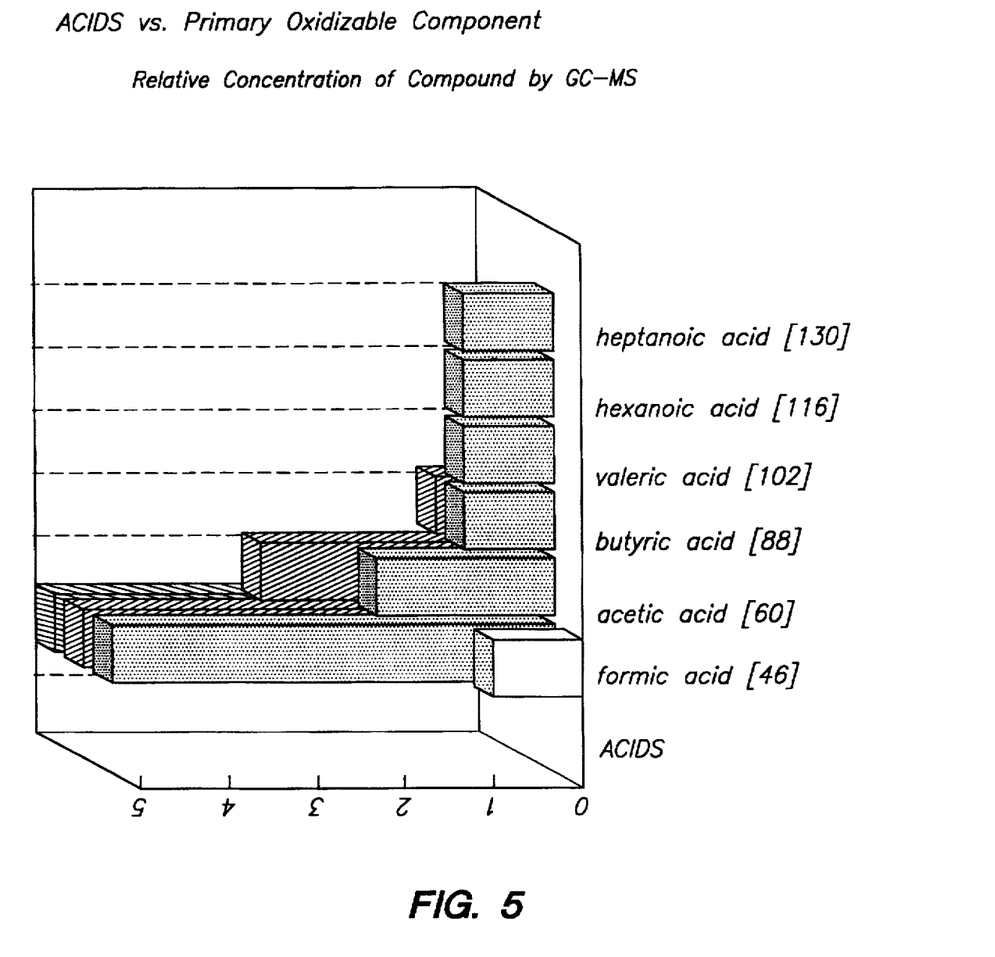
FIG. 5 shows the relative amounts of specific acids produced from examples containing blends of polyethylene with polyterpene, styrene/butadiene block copolymer, polybutadiene, or polyoctenamer.
Figure 6:
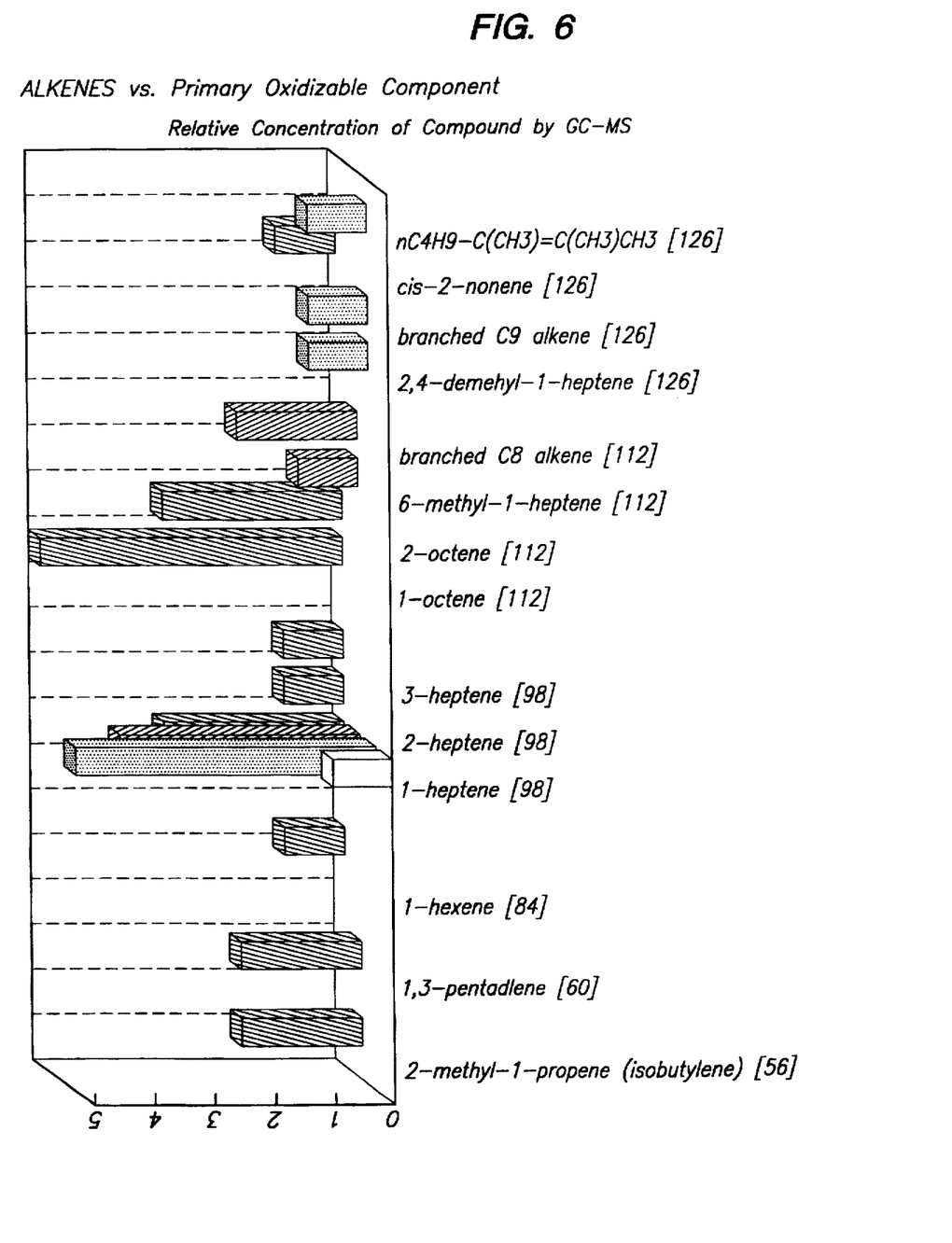
FIG. 6 shows the relative amounts of specific alkenes produced from examples containing blends of polyethylene with polyterpene, styrene/butadiene block copolymer, polybutadiene, or polyoctenamer.

In Run 101, 350 g PE 1017 resin from Chevron (low density polyethylene) and 150 g Piccolyte C 1 5 resin from Hercules (polylimonene) were melt blended at 170° C. to give a blend of 70 weight percent polyethylene and 30 weight percent Piccolyte. FIG. 1 demonstrates the oxygen scavenging properties at 4° C. of the thus produced blend of Run 101. The percent oxygen in a closed 300 cc headspace was measured on various days. The sample size was 0.25 g.

In Run 102, a blend of 90 weight percent Vector 8508D resin from Dexco(styrene/butadiene block copolymer) and 10 weight percent PE 1017 was prepared.

In Run 103, a blend of 54 weight percent Taktene 1202 rubber from Bayer (polybutadiene) and 36 weight percent PE 1017 was prepared.

In Run 104, a blend of 30 weight percent Vestenamer resin from Huls (polyoctenamer) and 70 weight percent PE 1017 was prepared.

The blends also contained 1000 ppm by weight Irganox 1076, and 1000 ppm by weight cobalt oleate. The blends were extruded into 1–1.5 mil thick films. The film samples were irradiated with a Blak-Ray UV lamp (254 nm, 5 mW/cm$^2$) for 1 minute. Film samples were 1 inch away from the UV lamps. A predetermined amount of samples of the thus prepared films was individually placed in 2"×30" glass tubes and purged at 20°–25° C. with 10–15 mL/min. one percent oxygen. The gas was trapped in 3 stages, trap 1—ice bath, trap 2—dry ice and acetone, and trap 3—bubbled gas through water. The trapped gases from the samples were analyzed using gas chromatography and mass spectrometry.

The relative amounts of specific by-products for Runs 101–104 are indicated by the bars in FIGS. 2-6. White represents Run 101. Light gray represents Run 102. Dark Gray represents Run 103. Black represents Run 104.

What is claimed is:

1. An oxygen scavenging composition comprising at least one polyterpene and at least one catalyst effective in catalyzing oxygen scavenging.

2. The oxygen scavenging composition according to claim 1, wherein the polyterpene comprises poly(alpha-pinene), poly(beta-pinene), poly(dipentene), poly(d-limonene, or poly(d,limonene).

3. The oxygen scavenging composition according to claim 1 which exhibits reduced amounts of oxidation by-products compared to substituted or unsubstituted ethylenically unsaturated hydrocarbon polymers,
wherein said substituted or unsubstituted ethylenically unsaturated hydrocarbons are selected from the group consisting of polybutadiene, polyisoprene and styrene-butadiene block copolymers.

4. The oxygen scavenging composition according to claim 1 wherein the polyterpene is present in an amount in the range of from about 5 weight percent to about 95 weight percent based on the total oxygen scavenging composition.

5. The oxygen scavenging composition according to claim 4 wherein the polyterpene is present in an amount in the range of from about 10 weight percent to about 75 weight percent based on the total oxygen scavenging composition.

6. The oxygen scavenging composition according to claim 5 wherein the polyterpene is present in an amount in the range of from 15 weight percent to 50 weight percent based on the total oxygen scavenging composition.

7. The oxygen scavenging composition according to claim 1 further comprising at least one carrier resin.

8. The oxygen scavenging composition according to claim 7 wherein the carrier resin exhibits a slower oxidation rate than the polyterpene.

9. The oxygen scavenging composition according to claim 8, wherein the carrier polymer is a polyester, a polyaromatic, or a polyolefin homopolymer, copolymer, or terpolymer.

10. The oxygen scavenging composition according to claim 9, wherein the carrier polymer is polyethylene, polystyrene, poly(ethylene-vinyl acetate), poly(ethylene-methyl acrylate), poly(ethylene-ethyl acrylate), poly (ethylenebutyl acrylate), or an ionomer of poly(ethylene-methyl acrylate), poly(ethylene-ethyl acrylate), or poly (ethylene-acrylic acid).

11. The oxygen scavenging composition according to claim 10, wherein the carrier polymer is polyethylene, poly(ethylene-methyl acrylate), or an ionomer of poly (ethylene-methyl acrylate) or poly(ethylene-acrylic acid).

12. The oxygen scavenging composition according to claim 11, wherein the carrier polymer is low density, linear low density, or ultra-low density polyethylene.

13. The oxygen scavenging composition according to claim 7 wherein the carrier resin is present in an amount in the range of from about 5 weight percent to about 95 weight percent based on the total oxygen scavenging composition.

14. The oxygen scavenging composition according to claim 10 wherein the carrier resin is present in an amount in the range of from about 25 weight percent to about 90 weight percent based on the total oxygen scavenging composition.

15. The oxygen scavenging composition according to claim 11 wherein the carrier resin is present in an amount in the range of from 50 weight percent to 85 weight percent based on the total oxygen scavenging composition.

16. The oxygen scavenging composition according to claim 1, wherein the catalyst is a transition metal salt.

17. The oxygen scavenging composition according to claim 16, wherein the catalyst is a cobalt salt.

18. The oxygen scavenging composition according to claim 17, wherein the catalyst is selected from the group consisting of cobalt oleate, cobalt linoleate, cobalt neodecanoate, cobalt stearate, and cobalt caprylate.

19. The oxygen scavenging composition according to claim 1 further comprising a photoinitiator.

20. The oxygen scavenging composition according to claim 7 wherein the carrier resin comprises an oxidizable polymer.

21. The oxygen scavenging composition according to claim 20 wherein the oxidizable polymer is a substituted or unsubstituted ethylenically unsaturated hydrocarbon polymer.

22. The oxygen scavenging composition according to claim 21 wherein the oxidizable polymer is polybutadiene, polyisoprene, poly(styrene-butadiene), poly(meta-xylenediamine-adipic acid), or polyacrylates which can be prepared by transesterification of poly(ethylene-methyl acrylate) including poly(ethylene-methyl acrylate-benzyl acrylate), poly(ethylene-methyl acrylate-tetrahydrofurfuryl acrylate), poly(ethylene-methyl acrylate-nopol acrylate), or mixtures thereof.

23. The oxygen scavenging composition according to claim 8, wherein the polyterpene comprises a first phase and the catalyst comprises a second phase, wherein the second phase is in sufficiently close proximity to the first phase to catalyze an oxygen scavenging reaction.

24. The oxygen scavenging composition according to claim 23, wherein the first phase forms a first layer and the second phase forms a second layer.

25. The oxygen scavenging composition according to claim 24, wherein the second layer is in contact with the first layer.

26. The oxygen scavenging composition according to claim 24, further comprising an oxygen barrier layer, a polymeric selective barrier layer, or a heat seal layer.

27. An oxygen scavenging composition comprising at least one polyterpene, at least one carrier resin, and at least one catalyst effective in catalyzing oxygen scavenging, wherein the carrier resin exhibits a slower oxidation rate than the polyterpene.

28. A film comprising the oxygen scavenging composition of claim 7.

29. An article comprising the oxygen scavenging composition of claim 7.

30. The article of claim 29 wherein the article is a package.

31. The article of claim 30 wherein the article is a package containing a food product.

32. The article of claim 30 wherein the article is a package containing a cosmetic, chemical, electronic device, pesticide or pharmaceutical.

33. The article of claim 29 wherein the article is a patch, bottle cap insert or molded or thermoformed shape.

34. The article of claim 33 wherein the molded or thermoformed shape is a bottle or tray.

35. A method for scavenging oxygen comprising placing an oxygen-sensitive product in the package of claim 30.

36. A method for preparing an oxygen scavenging composition comprising melt blending at least one polyterpene and at least one catalyst effective in catalyzing oxygen scavenging.

37. The method of claim 36 further comprising melt blending at least one carrier resin in the oxygen scavenging composition, wherein the carrier resin exhibits a slower oxidation rate than the polyterpene.

38. The method of claim 37 further comprising at least one photoinitiator.

* * * * *